United States Patent [19]

Bumgardner

[11] 3,903,432

[45] Sept. 2, 1975

[54] INTEGRATION GATE

[75] Inventor: John H. Bumgardner, Ridgecrest, Calif.

[73] Assignee: The United States of America as represented by the Secretary of the Navy, Washington, D.C.

[22] Filed: Aug. 7, 1974

[21] Appl. No.: 495,473

[52] U.S. Cl. ................ 307/229; 307/246; 307/293; 328/127

[51] Int. Cl.$^2$ ........................................ H03K 17/00

[58] Field of Search.................... 307/229, 246, 293; 328/127, 128, 67; 235/183

[56] References Cited

UNITED STATES PATENTS 3,219,934 11/1965 Kalfaian ............................ 307/246

3,374,362 3/1968 Miller ................................ 307/229

3,541,318 11/1970 Miller ................................ 328/127

*Primary Examiner*—Michael J. Lynch
*Assistant Examiner*—B. P. Davis
*Attorney, Agent, or Firm*—R. S. Sciascia; Roy Miller; Robert W. Adams

[57] ABSTRACT

An integration gate for integrating an input during the period an enabling digital pulse is received, including a temperature stable reference voltage source, a differential amplifier providing two current paths for the input controlled by the digital pulse, wherein the first path dumps the input and the second path is to a bank of individually and selectively enabled, integrating storage capacitors which provides selectable integration periods.

5 Claims, 1 Drawing Figure

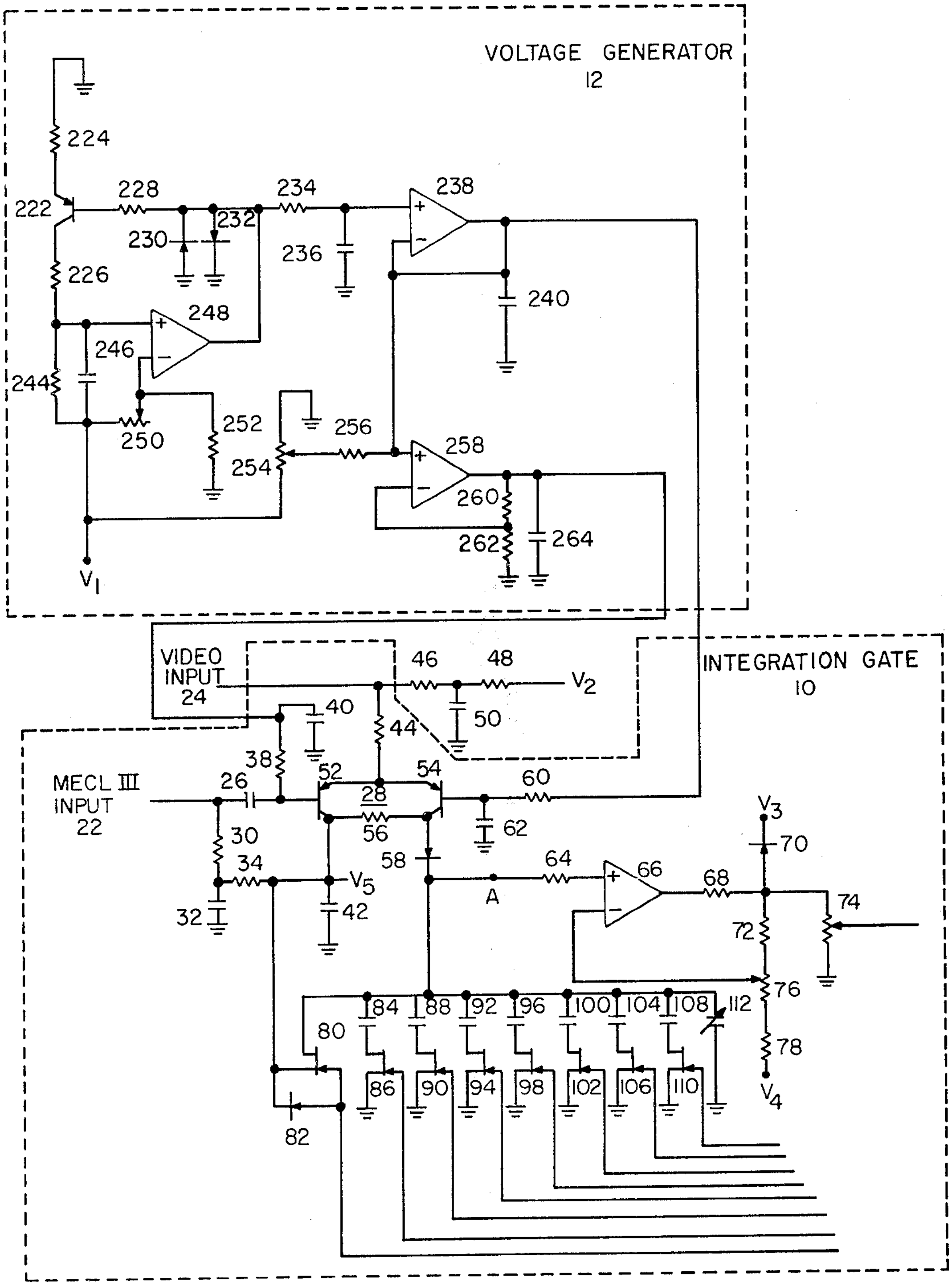
VOLTAGE GENERATOR
12
V1
VIDEO
INPUT
24
V2
INTEGRATION GATE
10
MECL III
INPUT
22
V5
A
V3
V4

INTEGRATION GATE

BACKGROUND OF THE INVENTION

In the field of radar systems, measurement of the returning, previously transmitted energy is necessary in order to determine the range to the target. The circuit must be accurately timed to process the returning signal and provide a meaningful output.

The present invention is an integration gate with a temperature tracking reference voltage generator, that predeterminedly segments the returning energy, and individually integrates each segment, to provide values which may be interrogated to identify possible targets. A plurality of parallel coupled, individually gated integrating capacitors are included in each gate to provide a means for selecting the segment period employed for processing the returning signal. That is, the capacitive value is selectable to determine the integrator gain to be consistent with the duration of the integrating period of the consecutively operated gates.

BRIEF DESCRIPTION OF THE DRAWING

The FIGURE is a schematic diagram of the preferred embodiment of the present invention.

DESCRIPTION OF THE PREFERRED EMBODIMENT

In the preferred embodiment of the present invention shown in the FIGURE, the input of integration gate 10 to be processed is present at input 24 and integrated during the period the Motorola Emitter Coupled Logic, third generation (MECL III) input is at a logic true at input 22. The electrical inputs coupled to inputs 22 and 24 are shown as MECL III and video inputs, respectively; but, are not so limited. Other inputs for other purposes wherein the signal to be integrated is coupled to input 24 and the integrating control signal is coupled to input 22 may be used.

During the period an input is coupled to input 22 transistor 52 of differential amplifier 28 is rendered nonconductive, causing transistor 54 to become conductive, which provides a current path for the input at input 24 to the integrating bank of capacitors 84, 88, 92, 96, 100, 104, 108 and 112. The integrated output which appears at A is coupled through the buffer and signal conditioner circuitry associated with operational amplifier 66 to the circuit's output taken at resistor 74.

Field effect transistors (FET) 86, 90, 94, 98, 102, 106 and 110 are individually coupled to voltage sources such that they can be selectively rendered conductive, coupling their respective capacitor into the circuit to integrate the input coupled to input 24. Since the integrating capacitors are each different in capacitive value, the capacitance coupled into the circuit can be selected by selectively gating its associated FET. Thereby, the integration gate gain is selected. This gain is a function desired integration period length. It is advisable that only one FET be rendered conductive at a time per gate to avoid resonance wherein two or more of the parallel coupled capacitors would operate as a tank circuit.

FET 80 and diode 82 are included to reset differential amplifier 28 to its initial conductive state wherein transistor 52 is conductive during the period no input is received at input 22. Feedback from resistor 76 of the output circuitry is coupled to operational amplifier 66 as a zero adjust device to compensate for any nonzero value that might be seen at the output before the circuit is placed in operation by coupling the inputs thereto.

Reference voltage generator 12 is a temperature compensating voltage supply wherein the voltage at the base of transistor 54 is maintained equal to the voltage at the base of transistor 222 by the servo circuitry shown. In order to achieve this equality, resistor 224 of generator 12 is chosen to match resistor 44 of each integration gate 10 employed in the system. The purpose of the circuit is to automatically provide the voltage at the base of transistor 54 that is necessary to maintain the integration transistor bias level current at a preselected value. The exact current level is set by adjesting variable resistor 250 which controls one of the inputs of operational amplifier 248. The circuit will then cause the value of the bias voltage at the base of transistor 54 to vary in such a manner as to keep the current level at the selected value independant of temperature changes. Variable resistor 254 is adjusted to select the amount of offest voltage the bias level coupled through resistor 38 to the base of transistor 52 has from the voltage bias level coupled to the base of transistor 54.

The voltage generator is designed so that all temperature changes result in no change in operating characteristics. Both voltage coupled from generator 12 to gate 10 change as required to keep the differential bias and operating current, and voltage values independant of temperature.

The following set of components and values form an operable embodiment of the present invention; but, are listed as an example only and should not be considered to limit the invention to the specifics shown. They were chosen by the designer for sever parrallel integration gates providing seven successive integration periods without system resetting, having a 50 ohm system input impedance from D. C. to above 100MH$_z$, and providing individual integration times of 25, 50, 100, 200, 400, 800 and 1,600 nanoseconds, as desired.

| SYMBOL | COMPONENT | TYPE OR VALUE |
|---|---|---|
| 26 | capacitor | 0.1 μf |
| 28 | transistor | 2N4261 |
| 30 | resistor | 75 ohm |
| 32 | capacitor | 0.1 μf |
| 34 | resistor | 390 ohm |
| 38 | resistor | 150 ohm |
| 40 | capacitor | 0.1 μf |
| 42 | capacitor | 0.1 μf |
| 44 | resistor | 365 ohm (match R 224) |
| 46 | resistor | 3K ohm |
| 48 | resistor | variable trim |
| 50 | capacitor | 0.1 μf |
| 52 & 54 | transistors | (see 28) |
| 56 | resistor | 10K ohm |
| 58 | diode | HPA 2510 (selected) |
| 60 | resistor | 10 ohm |
| 62 | capacitor | 0.1 μf |
| 64 | resistor | 1K ohm |
| 66 | operational amplifier | M501C |
| 68 | resistor | 3K ohm |
| 70 | diode | HPA 2800 |
| 72 | resistor | 10K ohm |
| 74 | resistor | 5K ohm |
| 76 | resistor | 500 cermet |
| 78 | resistor | 10K ohm |
| 80,86,90, 94,98,102, 106,110 | field effect transistor | 2N4391 |
| 82 | diode | HPA 2120 |
| 84 | capacitor | 130 pf |
| 88 | capacitor | 270 pf |
| 92 | capacitor | 510 pf |
| 96 | capacitor | 1 μf |

-Continued

| SYMBOL | COMPONENT | TYPE OR VALUE |
|---|---|---|
| 100 | capacitor | 2 μf |
| 104 | capacitor | 4.3 μf |
| 108 | capacitor | 8.2 μf |
| 112 | capacitor | 0.5–10 pf (trimmer) |
| 222 | transistor | 2N4261 (matched to 52–54) |
| 224 | resistor | 365 ohm (matched to R44) |
| 226 | resistor | 10K ohm |
| 228 | resistor | 10 ohm |
| 230 | diode | MPD 300 |
| 232 | diode | 1N4151 |
| 234 | resistor | 10K ohm |
| 236 | capacitor | 6.8 μf |
| 238 | operational amplifier | μA741 |
| 240 | capacitor | 68 μf (30v) |
| 244 | resistor | 4.99K |
| 246 | capacitor | 0.25 μf |
| 248 | operational amplifier | μA741 |
| 250 | resistor | 1K cermet |
| 252 | resistor | 4.99K |
| 254 | resistor | 500 ohm cermet |
| 256 | resistor | 1K cermet |
| 258 | operational amplifier | μ741 |
| 260 | resistor | 10K |
| 262 | resistor | 1K |
| 264 | capacitor | 68 μf (30v) |
| $V_1$ | voltage supplied | −5.2 volts,dc |
| $V_2$ | voltage supplied | +15 volts, dc |
| $V_3$ | voltage supplied | +5 volts, dc |
| $V_4$ | voltage supplied | −10 volts,dc |
| $V_5$ | voltage supplied | −5 volts,dc |

The present invention operates as follows:

The input at input 22 is a digital level. Since the quiescent "O" and "1" levels vary as a function of temperature the logic level swings (changes only) are coupled into the base of transistor 52. The threshhold voltage level coupled from generator 12 to the base of transistor 52 is chosen sufficiently below that of the bias voltage coupled to the base of transistor 54 to cause the design maximum leakage current to flow from transistor 54 with logic "0" on transistor 52 of each gate. Also, the bias voltage on the base of transistor 54 varies with temperature to keep the current source leakage current at a specified designed value in order to maintain linear operation of the current source transistor (transistor 54) when gating transistor 52 receives a "1" from logic input 22, which input renders transistor 54 conductive.

When transistor 54 is rendered conductive the signal appearing at input 54 is coupled to the selectively activated capacitor of the integrating capacitor bank described above. The value of the capacitor which has been selectively activated determines the integration gate gain and allowable period.

Additional gates 10 may be aprallel coupled to input 24, and to consecutive outputs from such as MECL III digital logic pulses. Thereby, each gate employed integrates a portion of the input received at input 24 as it is enabled by a digital input, wherein successive gates integrate successive portions of the input. Generator 12 is a temperature tracking voltage source which maintains the operating characteristics discussed above as the temperature varies.

The advantages of the present invention include fewer components, temperature independence, direct interface with the digital logic level employed, and accuracy from gate to gate that is dependent upon the accuracy of the integration storage capacitors employed. By utilizing the specific circuit and components disclosed herein, integration with bandwidths of more than 100 megahertz, and accurate, highdynamic range integration from dc to more than 100 megahertz with less than one-half per cent of nonlinearity at the minimum input voltages, are possible.

What is claimed is:

1. A circuit for precisely integrating a large dynamic range of electrical signals within a wide bandwidth, comprising:

a source of temperature compensating electrical voltages; and at least one gated, electrical signal integrating means having a plurality of inputs, wherein the first input is coupled to the source of said electrical signals, the second is coupled to a source of gating electrical values, and the third and fourth are coupled to said source of electrical voltages, for electronically integrating said electrical signals during the period the gating values are received by said second input, including a differential amplifier providing alternate current paths through said means for said electrical signals, and a bank of capacitive paths wherein each path of said bank of paths provides a different integrating period, and each path of said bank is mutually exclusively selectable to couple the capacitance therein to the second of said alternate paths;

wherein said electrical signals are conducted by the first of said alternate paths during the period that the gating values are not received, and by said second path during the period that the gating values are received, and the output of integrated signals is provided across said bank of capacitive paths.

2. The circuit of claim 1 wherein said differential amplifier includes first and second transistors, each having an emitter, a collector and a base, wherein the emitters are coupled in common to said first input, the base of said first transistor is coupled to said second and said third inputs, the base of said second transistor is coupled to said fourth input, and the collector of said second transistor is coupled to said bank of capacitive paths, such that said first transistor provides said first path through said means and said second transistor provides said second path.

3. The circuit of claim 2 wherein said bank of capacitive paths includes a plurality of parallel coupled branches, each having a capacitor in series with an electrically controlled switch, such that when a switch is closed that branch is conductive, electrically coupling its capacitor into said second path.

4. The circuit of claim 3 wherein said source of electrical voltages includes a third transistor having an emitter, a collector, and a base, and servo means coupled to said collector and base of said third transistor for maintaining the voltage at the base of said second transistor of said means equal to the voltage at the base of said third transistor, wherein said emitter of said third transistor is coupled to the circuit common ground, and said collector is also coupled to a constant voltage source, and said servo means provides adjustable first and second temperature compensating outputs that are coupled to said third and fourth inputs of said means.

5. The circuit of claim 4 further including output circuitry coupled to said second path between said the collector of second transistor and said bank of capacitive paths, including an operational amplifier having its non-inverting terminal coupled to said second path, and a feedback network coupling a portion of the operational amplifier's output to its inverting terminal, wherein the operational amplifier provides the output of the circuit.

* * * * *